(12) United States Patent
Ueno et al.

(10) Patent No.: US 9,545,919 B2
(45) Date of Patent: Jan. 17, 2017

(54) CONTROL DEVICE FOR HYBRID VEHICLE

(71) Applicant: Mitsubishi Jidosha Kogyo Kabushiki Kaisha, Tokyo (JP)

(72) Inventors: Hiroaki Ueno, Okazaki (JP); Toshiyuki Miyata, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/567,454

(22) Filed: Dec. 11, 2014

(65) Prior Publication Data

US 2015/0166057 A1 Jun. 18, 2015

(30) Foreign Application Priority Data

Dec. 13, 2013 (JP) .................. 2013-258637

(51) Int. Cl.
*B60W 20/00* (2016.01)
*B60W 10/06* (2006.01)
*B60W 10/08* (2006.01)
*B60W 10/30* (2006.01)
*B60K 6/442* (2007.10)
*B60W 50/029* (2012.01)

(52) U.S. Cl.
CPC .............. *B60W 20/50* (2013.01); *B60K 6/442* (2013.01); *B60W 10/06* (2013.01); *B60W 10/08* (2013.01); *B60W 10/30* (2013.01); *B60W 2050/0295* (2013.01); *B60W 2510/0619* (2013.01); *B60W 2560/02* (2013.01); *Y02T 10/6234* (2013.01); *Y02T 10/6286* (2013.01); *Y02T 10/7077* (2013.01); *Y10S 903/93* (2013.01)

(58) Field of Classification Search
None
See application file for complete search history.

(56) References Cited

U.S. PATENT DOCUMENTS

| 5,949,146 | A  * | 9/1999 | VandenBerghe | ........ F02B 63/04 123/339.19 |
| 6,173,569 | B1 * | 1/2001 | Kusada | .................... B60K 6/24 180/65.235 |
| 6,470,854 | B1 * | 10/2002 | Hirata | .................... F02D 31/005 123/436 |
| 6,519,513 | B2 * | 2/2003 | Nakagawa | ............... B60K 6/48 701/108 |
| 6,700,213 | B1 * | 3/2004 | Kumagai | ............... B60K 6/485 180/65.1 |
| 6,820,603 | B2 * | 11/2004 | Yasui | .................... F02D 11/105 123/399 |
| 6,931,836 | B2 * | 8/2005 | Steinert | ............... F02D 41/1475 123/305 |

(Continued)

FOREIGN PATENT DOCUMENTS

JP 2001-3803 A 1/2001

*Primary Examiner* — Jonathan M Dager
(74) *Attorney, Agent, or Firm* — Birch, Stewart, Kolasch & Birch, LLP

(57) ABSTRACT

A control device for a hybrid vehicle, which can inhibit damage to an exhaust purification catalyst and also suppress deterioration of drivability, is provided. The control device exercises catalyst protective control, which inhibits operation of an engine and drives a traction motor, if a state where an exhaust air-fuel ratio detected by an exhaust air-fuel ratio detection unit is lean continues for a first predetermined time or longer.

8 Claims, 5 Drawing Sheets

(56) References Cited

U.S. PATENT DOCUMENTS

| | | | | |
|---|---|---|---|---|
| 7,275,516 B1* | 10/2007 | Cunningham | ...... | F02D 13/0261 123/305 |
| 2002/0112467 A1* | 8/2002 | Uranishi | ............... | F01N 11/007 60/277 |
| 2007/0204830 A1* | 9/2007 | Andri | ...................... | B60K 6/445 123/198 F |
| 2007/0205028 A1* | 9/2007 | Leone | .................... | B60K 6/445 180/65.28 |
| 2007/0205029 A1* | 9/2007 | Leone | .................... | B60K 6/365 180/65.225 |
| 2011/0072791 A1* | 3/2011 | Bidner | ................... | B60K 6/485 60/278 |
| 2011/0203551 A1* | 8/2011 | Russ | .................. | F02D 41/0007 123/406.45 |
| 2011/0213547 A1* | 9/2011 | Reed | .................. | F02D 41/0235 701/109 |
| 2011/0265455 A1* | 11/2011 | Hirota | ..................... | F01N 3/206 60/285 |
| 2012/0216507 A1* | 8/2012 | Nieuwstadt | ............. | F01N 3/101 60/274 |
| 2013/0218442 A1* | 8/2013 | Miyaji | ................ | F02D 41/1454 701/108 |
| 2014/0123630 A1* | 5/2014 | Eckhoff | .................. | F01N 3/035 60/274 |
| 2014/0196445 A1* | 7/2014 | Morisaki | ................ | F02D 41/06 60/299 |
| 2014/0250990 A1* | 9/2014 | Matsunaga | ............... | H02P 1/00 73/114.01 |
| 2014/0305102 A1* | 10/2014 | Kumagai | ............. | F01N 3/2013 60/286 |
| 2015/0047415 A1* | 2/2015 | Michalske | .......... | F02D 41/1454 73/23.31 |
| 2015/0151759 A1* | 6/2015 | Oyama | ............... | B60W 20/108 701/22 |
| 2015/0184605 A1* | 7/2015 | Matsumura | ......... | F02D 41/0295 60/285 |
| 2015/0298687 A1* | 10/2015 | Kanno | ................... | B60K 6/445 701/22 |
| 2016/0025026 A1* | 1/2016 | Kitaura | ............... | F02D 41/1439 60/276 |
| 2016/0107636 A1* | 4/2016 | Morita | ................ | B60W 30/192 701/22 |

\* cited by examiner

CONTROL DEVICE FOR HYBRID VEHICLE

The entire disclosure of Japanese Patent Application No. 2013-258637 filed Dec. 13, 2013 is expressly incorporated by reference herein.

TECHNICAL FIELD

This invention relates to a control device for a hybrid vehicle equipped with an engine (internal combustion engine) and a traction motor (electric motor) as a drive source.

BACKGROUND ART

An engine loaded on a vehicle is generally subjected to feedback control so that the air-fuel ratio of exhaust becomes a target air-fuel ratio, based on the results of detection by an exhaust air-fuel ratio sensor (for example, an $O_2$ sensor or a linear air-fuel ratio sensor (LAFS)) provided in an exhaust pipe.

However, if the amount of fuel remaining in a fuel tank is small, for example, fuel supply may be insufficient, and the exhaust air-fuel ratio may continue to be lean. If such a lean state of the exhaust air-fuel ratio persists, there is a possibility that the exhaust air-fuel ratio sensor will be erroneously judged to be abnormal, and the engine cannot be controlled appropriately.

A solution to the above-mentioned problems is a technology comprising switching judgment conditions for judging an abnormality in a system according to the amount of fuel remaining within a fuel tank, thereby preventing a temporary abnormal phenomenon, which occurs owing to a decrease in the remaining amount of fuel, from being erroneously judged to be an abnormality in the system (see Patent Document 1).

PRIOR ART DOCUMENTS

Patent Documents

[Patent Document 1] JP-A-2001-3803

SUMMARY OF THE INVENTION

Problems to be Solved by the Invention

An erroneous judgment of an abnormality in an exhaust air-fuel ratio sensor or the like associated with a decrease in the remaining amount of fuel can be prevented, for example, by the technology described in Patent Document 1.

If the lean state of the exhaust air-fuel ratio continues because of a decrease in the fuel remaining amount, however, there may be a trouble aside from the above erroneous judgment. For example, the persistent leanness of the exhaust air-fuel ratio due to the decreased remaining amount of fuel is likely to raise the exhaust gas temperature, thus posing the problem of damaging an exhaust purification catalyst.

As a method for preventing such damage to the exhaust purification catalyst, it is conceivable to stop the engine if the state of the exhaust air-fuel ratio being lean continues. In the case of the vehicle traveling by the driving force of the engine, however, it is difficult to stop the engine while the vehicle is traveling.

In the case of a hybrid vehicle equipped with a traction motor together with an engine, it is possible to stop the engine while the vehicle is traveling. Unnecessary stoppage of the engine, however, may deteriorate drivability. In stopping the engine, therefore, it is required to detect, accurately, that the cause of the lean exhaust air-fuel ratio is a decrease in the fuel remaining amount.

The present invention has been accomplished in the light of the above-mentioned situations. It is an object of this invention to provide a control device for a hybrid vehicle, the control device being capable of inhibiting damage to an exhaust purification catalyst and also suppressing deterioration of drivability.

Means for Solving the Problems

A first aspect of the present invention for solving the above problems is a control device for a hybrid vehicle equipped with an engine and a traction motor and having an exhaust purification catalyst in an exhaust passage, the control device comprising: an exhaust air-fuel ratio detection unit, provided in the exhaust passage, for detecting the exhaust air-fuel ratio of the engine; and a protective control unit for exercising catalyst protective control which inhibits operation of the engine and drives the traction motor if a state, where the exhaust air-fuel ratio detected by the exhaust air-fuel ratio detection unit is lean, continues for a first predetermined time or longer.

According to the first aspect mentioned above, it is possible to detect, accurately, whether or not the lean state of the exhaust air-fuel ratio is due to a decrease in the remaining amount of fuel, and exercise catalyst protective control with a suitable timing.

A second aspect of the present invention is the control device for a hybrid vehicle according to the first aspect, further comprising a complete explosion detection unit for detecting that complete explosion of the engine has occurred when the engine is started, wherein the protective control unit exercises the catalyst protective control after a lapse of a second predetermined time from detection of the complete explosion of the engine by the complete explosion detection unit.

According to the second aspect, even at the start of the engine, a state where the exhaust air-fuel ratio becomes lean in accordance with a decrease in the remaining amount of fuel can be accurately determined, and protective control over the catalyst can be performed with a more suitable timing.

A third aspect of the present invention is the control device for a hybrid vehicle according to the second aspect, wherein the protective control unit prolongs the second predetermined time as the time from the start of the engine until the detection of the complete explosion of the engine by the complete explosion detection unit lengthens.

According to the third aspect, a state where the exhaust air-fuel ratio becomes lean in accordance with a decrease in the remaining amount of fuel can be determined more accurately.

A fourth aspect of the present invention is the control device for a hybrid vehicle according to any one of the first to third aspects, further comprising an oil supply detection unit for detecting that oil supply to a fuel tank has been performed, wherein the protective control unit discontinues the execution of the catalyst protective control when the execution of the oil supply is detected by the oil supply detection unit.

According to the fourth aspect, catalyst protective control can be terminated with a proper timing.

Effects of the Invention

According to the present invention, as described above, catalyst protective control is exercised with an appropriate timing, whereby a rise in the exhaust temperature associated with a decrease in the fuel remaining amount can be suppressed. Eventually, damage to the exhaust purification catalyst due to the rise in the temperature of exhaust can be prevented. Moreover, unnecessary exercise of catalyst protective control can be prevented to suppress deterioration of drivability.

MODE FOR CARRYING OUT THE INVENTION

Embodiments of the present invention will be described in detail with reference to the accompanying drawings.
(Embodiment 1)

Figure 1:
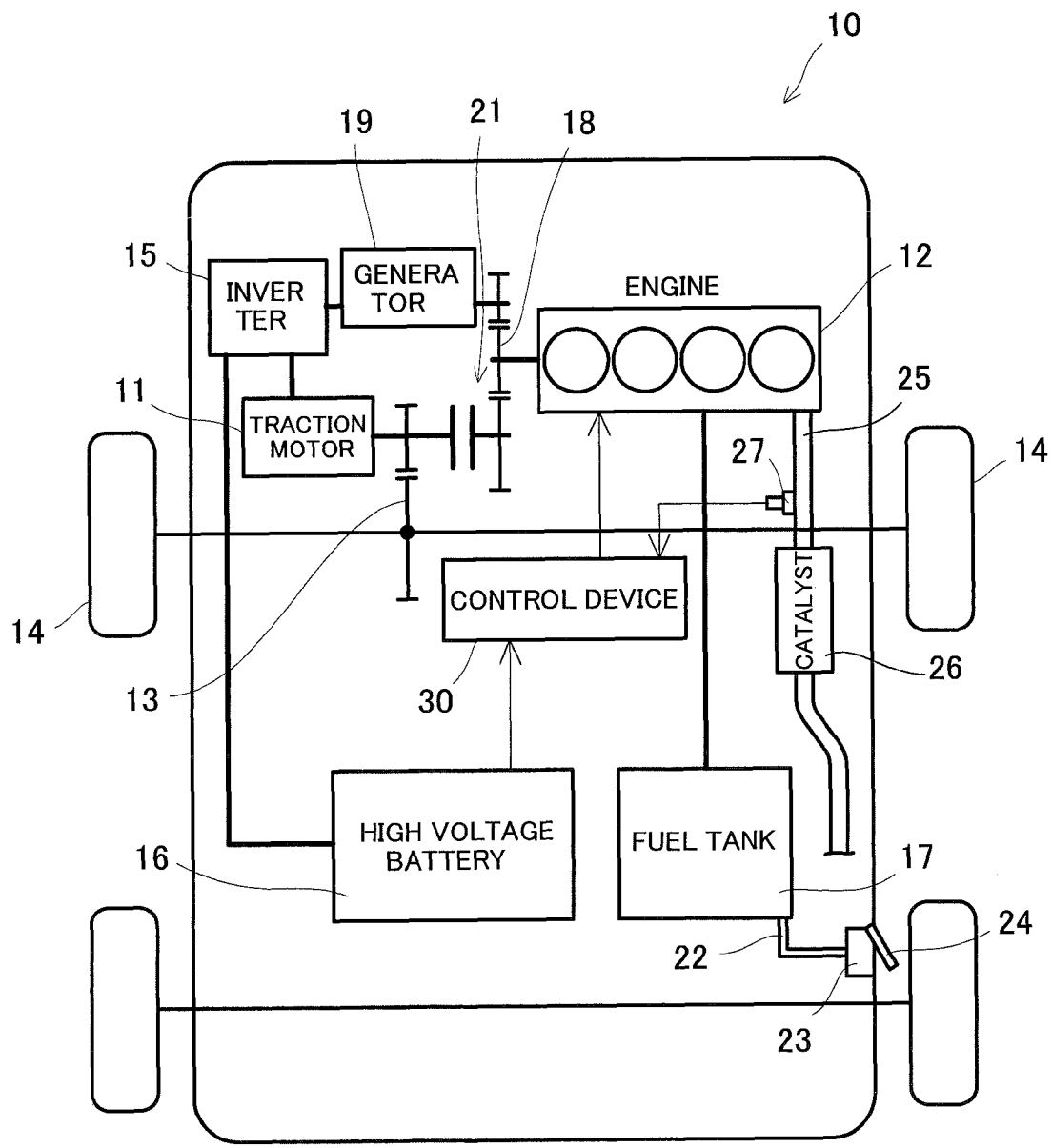
FIG. 1 is a schematic view showing an example of a hybrid vehicle according to Embodiment 1 of the present invention.

As shown in FIG. 1, a hybrid vehicle (may hereinafter be referred to simply as "vehicle") 10 according to the present embodiment has, as a drive source for traveling, a traction motor 11 and an engine 12. The traction motor 11 is connected to front wheels 14 via a power transmission mechanism 13. A high voltage battery 16 is connected to the traction motor 11 via an inverter (motor inverter) 15.

The engine 12 is driven by combustion of fuel supplied from a fuel tank 17. The engine 12 is connected to a generator (electric power generator) 19 via an output system 18. The generator 19 is connected to the high voltage battery 16 via the inverter (generator inverter) 15. The output system 18 is connected to the generator 19 on one hand, and is also connected to the power transmission mechanism 13 via a clutch 21 on the other hand.

The fuel tank 17 is connected via a fuel pipe 22 to an oil filler port 23 provided in a vehicle body, and fuel is supplied through the oil filler port 23. The oil filler port 23 is closed with a lid 24 together with an inner lid (not shown). The lid 24 is opened by operating a predetermined switch (not shown).

The vehicle 10 is also equipped with a control device 30 for controlling, overall, various units loaded on the vehicle 10. The control device 30 grasps the operating state of the vehicle 10 based on signals from various sensors provided in the vehicle 10, and generally controls the various units based thereon.

In an exhaust pipe 25 connected to the engine 12, for example, an exhaust purification catalyst 26 such as a three-way catalyst is interposed. Upstream of the exhaust purification catalyst 26, there is provided a linear air-fuel ratio sensor (LAFS) 27 which is an exhaust air-fuel ratio detection unit for detecting an exhaust air-fuel ratio (oxygen concentration). In accordance with the results of detection by the linear air-fuel ratio sensor 27, the control device 30 exercises feedback control over a fuel injection volume or the like so that the exhaust air-fuel ratio becomes a target air-fuel ratio.

Such feedback control can usually bring the exhaust air-fuel ratio to a value close to the target air-fuel ratio. However, if the amount of remaining fuel decreases, for example, the exhaust air-fuel ratio may enter a lean state. If the lean state of the exhaust air-fuel ratio continues, there is a possibility that the exhaust temperature will rise, causing damage to the exhaust purification catalyst 26. Since the exhaust air-fuel ratio is lean, moreover, the engine 12 may misfire. As a result, the unburned fuel may flow into the exhaust pipe, causing an oxidation reaction within the exhaust pipe, thereby raising the temperature of the exhaust gas to damage the exhaust purification catalyst 26.

As will be described in detail below, therefore, the control device 30 effects catalyst protective control to inhibit the operation of the engine 12, thereby suppressing damage to the exhaust purification catalyst 26. If the catalyst protective control is performed to a degree greater than required, however, problems may occur, such as the inappropriate action of the engine 12, or deterioration of drivability. Thus, the control device 30 accurately determines a state where the exhaust air-fuel ratio becomes lean owing to a decrease in the remaining amount of fuel. Based on the results of determination, the control device 30 exercises catalyst protective control with an appropriate timing.

Figure 2:
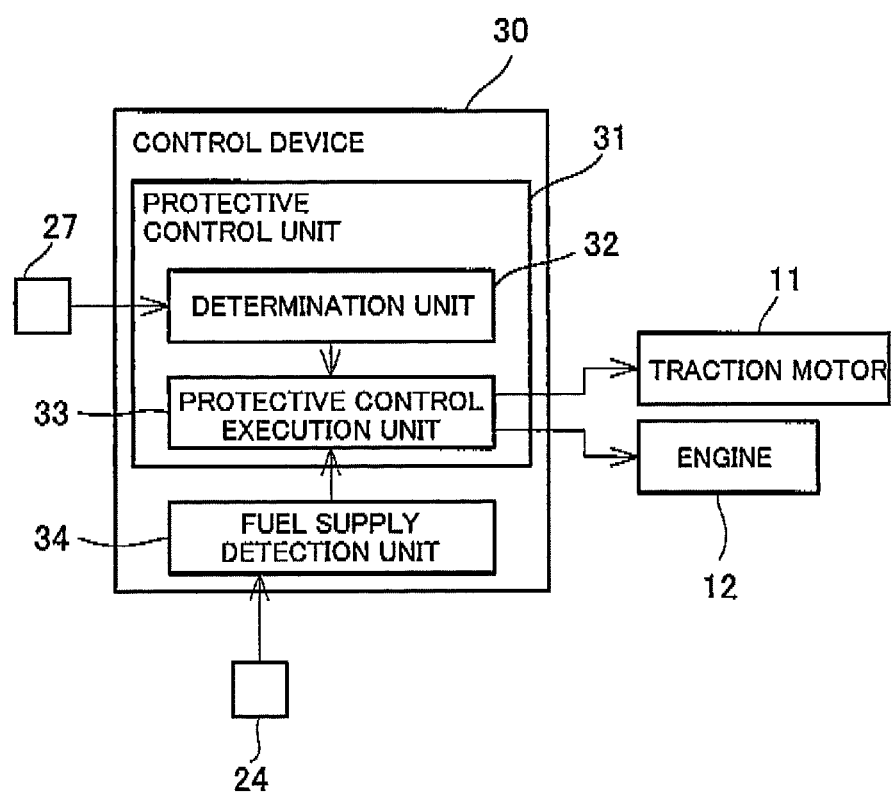
FIG. 2 is a block diagram showing the schematic configuration of a control device according to Embodiment 1 of the present invention.

Concretely, the control device 30 includes a protective control unit 31 for performing catalyst protective control, as shown in FIG. 2. The protective control unit 31 has a determination unit 32 and a protective control execution unit 33. In the present embodiment, the control device 30 further includes a fuel supply detection unit 34.

The determination unit 32 makes a determination of whether or not a state where the exhaust air-fuel ratio detected by the linear air-fuel ratio sensor (LAFS), the exhaust air-fuel ratio detection unit, is lean continues for a first predetermined time or longer (i.e., a continuation time determination). The first predetermined time may be decided on, as appropriate, depending on the properties of the engine 12, and is set at a time of the order of several seconds, for example.

If the determination unit 32 determines that the state of the exhaust air-fuel ratio being lean continues for the first predetermined time or longer, the protective control execution unit 33 executes catalyst protective control, inhibits the operation of the engine 12, and drives the traction motor 11.

The hybrid vehicle 10 according to the present embodiment has a plurality of travel modes. Concretely, the vehicle 10 has an EV travel mode in which the traction motor 11 serves as a drive source, a series travel mode in which the engine 12 is used as an electric power supply source for the traction motor 11, and a parallel travel mode in which the front wheels 14 of the vehicle 10 are driven by the driving forces of both the traction motor 11 and the engine 12. Any of these travel modes is selected, as appropriate, depending on the operating state.

When the protective control execution unit 33 exercises catalyst protective control, the EV travel mode is selected regardless of the operating state of the vehicle. As a result, the operation of the engine 12 is inhibited, whereas the traction motor 11 is driven.

The fuel supply detection unit 34 detects that fuel supply to the fuel tank 17 has been performed. When the execution of fuel supply is detected by the fuel supply detection unit 34, the protective control execution unit 33 discontinues the execution of catalyst protective control. This is because the execution of fuel supply eliminates the leanness of the exhaust air-fuel ratio due to the remaining amount of fuel. A method for detecting the execution of fuel supply is not limited, but it is judged that fuel supply has been carried out, for example, when the lid 24 is closed.

Figure 3:
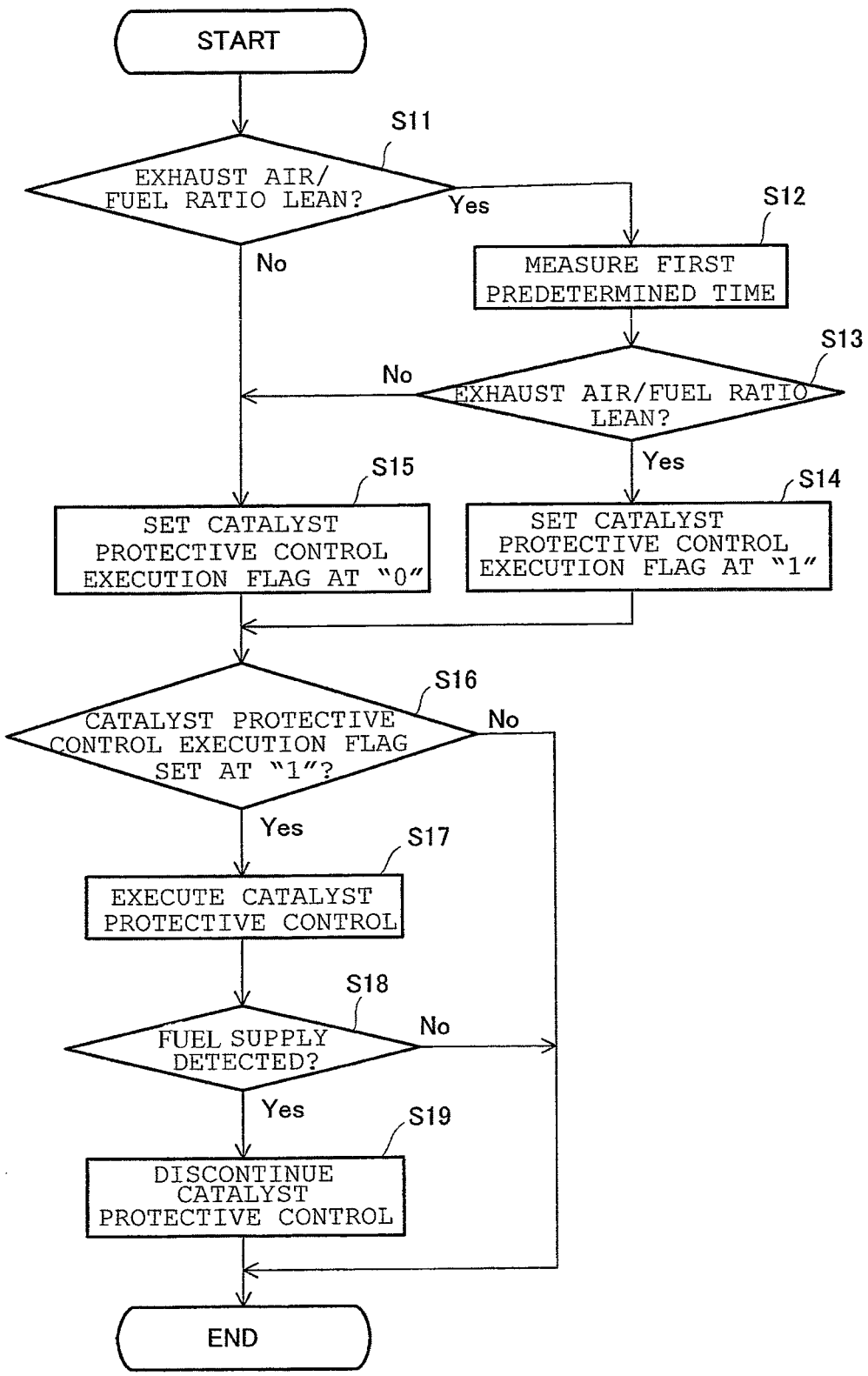
FIG. 3 is a flowchart showing an example of catalyst protective control according to Embodiment 1 of the present invention.

Next, an example of the catalyst protective control according to the present embodiment will be described by reference to a flowchart shown in FIG. 3.

When it is detected by the linear air-fuel ratio sensor (LAFS) 27 that the exhaust air-fuel ratio is lean, with the engine 12 being started (Step S11: Yes), a determination is made as to whether or not the state where the exhaust air-fuel ratio is lean continues for the first predetermined time or longer (continuation time determination). Concretely, in Step S12, the first predetermined time is measured with a timer or the like (not shown). Then, in Step S13, it is determined whether or not the state where the exhaust air-fuel ratio is lean continues. If the state where the exhaust air-fuel ratio is lean continues (Step S13: Yes), a catalyst protective control execution flag is set at "1" in Step S14. If the state where the exhaust air-fuel ratio is lean is not continued (Step S13: No), on the other hand, the catalyst protective control execution flag is set at "0" in Step S15. In case the leanness of the exhaust air-fuel ratio is not detected in Step S11 (Step S11: No), the program proceeds to Step S15, and the catalyst protective control execution flag is set at "0".

Then, the program proceeds to Step S16, whereupon catalyst protective control is or is not exercised depending on the catalyst protective control execution flag. That is, when the catalyst protective control execution flag has been set at "1" (Step S16: Yes), catalyst protective control is effected to switch the travel mode to the EV travel mode regardless of the operating state of the vehicle (Step S17). When the catalyst protective control execution flag has been set at "0" (Step S16: No), catalyst protective control is not effected, and the travel mode is switched, as appropriate, depending on the operating state of the vehicle.

Then, the presence or absence of fuel supply is determined in Step S18. When the execution of fuel supply is detected (Step S18: Yes), catalyst protective control is discontinued (Step S19), and switching of the travel mode depending on the operating state of the vehicle takes place again.

As described above, in the present embodiment, it is determined accurately by the determination unit 32 whether or not the state where the exhaust air-fuel ratio is lean results from a decrease in the remaining amount of fuel. According to the results of determination, therefore, the protective control execution unit 33 can exercise catalyst protective control with a suitable timing. Thus, a rise in the exhaust temperature associated with the decrease in the fuel remaining amount can be suppressed, with the result that damage to the exhaust purification catalyst 26 due to the elevation of the exhaust temperature can be prevented. Furthermore, unnecessary execution of catalyst protective control can be prevented to suppress the deterioration of drivability.

(Embodiment 2)

Figure 4:
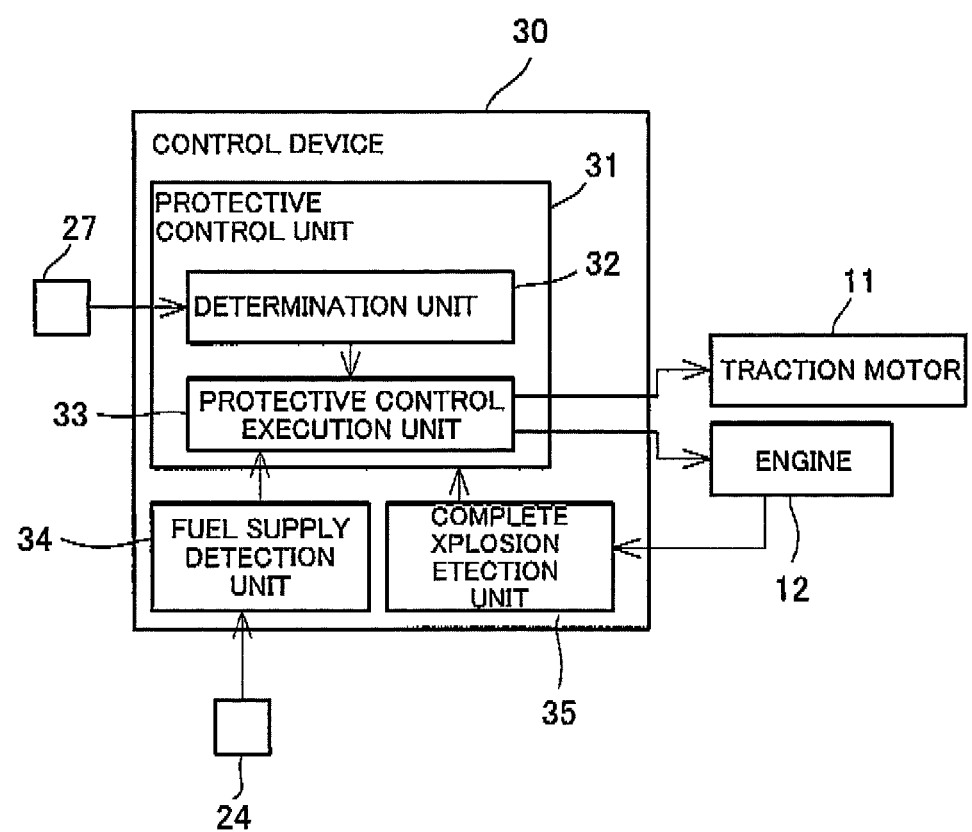
FIG. 4 is a block diagram showing the schematic configuration of a control device according to Embodiment 2 of the present invention.

FIG. 4 is a block diagram of a control device for a hybrid vehicle according to Embodiment 2 of the present invention.

The present embodiment is an example in which a timing for exercising catalyst protective control is adjusted according to the combustion state of the engine 12 at the time of staring the engine 12. Concretely, it is an example in which after a lapse of a second predetermined time from detection of the complete explosion of the engine 12 at the time of starting the engine 12, determination by a determination unit 32 is made, and catalyst protective control is exercised based on the results of determination.

As shown in FIG. 4, a control device 30 according to the present embodiment further includes a complete explosion detection unit 35 in addition to the determination unit 32 and a protective control execution unit 33, which constitute a protective control unit 31, and a fuel supply detection unit 34.

The complete explosion detection unit 35 detects that complete explosion of the engine 12 has taken place at the time of starting the engine 12. A method of detecting the complete explosion of the engine 12 is not limited, but the complete explosion of the engine 12 may be determined, for example, based on the engine torque, or based on the angular velocity detected by a crank angle sensor.

The determination unit 32 makes "continuation time determination", as in Embodiment 1, after a lapse of the second predetermined time from the detection of the complete explosion of the engine 12 by the complete explosion detection unit 35. In the present embodiment, the second predetermined time is always set at a constant time regardless of the timing with which complete explosion of the engine 12 is detected. The second predetermined time is not limited, and may be decided on, as appropriate, for example, according to the properties of the engine 12.

The protective control execution unit 33 exercises catalyst protective control if it is determined upon the "continuation time determination" that the state where the exhaust air-fuel ratio is lean continues for the first predetermined time, as in the case of Embodiment 1.

By adopting the features of the present embodiment described above, the state of the exhaust air-fuel ratio becoming lean in association with a decrease in the amount of remaining fuel can be accurately determined even at the time of starting the engine. In accordance with this determination, catalyst protective control can be effected with an appropriate timing.

When the engine is started for the first time after production of the vehicle or after servicing of the fuel system of the engine, for example, there is a case where no fuel is present within the fuel line. In this case, a state where the exhaust air-fuel ratio is lean continues until fuel is filled into the fuel line. That is, at the first start of the engine after vehicle production or the like, the state where the exhaust air-fuel ratio is lean continues for a longer time than at the usual start of the engine.

According to the control device 30 for a hybrid vehicle concerned with the present embodiment, catalyst protective control can be exercised with a suitable timing even at the initial start of the engine after vehicle production or the like. That is, continuation time determination by the determination unit 32 is carried out after a lapse of the second predetermined time from the detection of engine complete explosion. By so doing, the state where the exhaust air-fuel ratio is lean as a result of a decrease in the remaining fuel amount can be accurately determined. Based on this determination, catalyst protective control can be effected with an appropriate timing.

Even at the start of the engine, therefore, a rise in the exhaust temperature due to a decrease in the amount of remaining fuel can be suppressed, so that damage to the exhaust purification catalyst ascribed to the elevation of the exhaust temperature can be inhibited. Moreover, unnecessary execution of catalyst protective control can be prevented to suppress deterioration of drivability.

Figure 5:
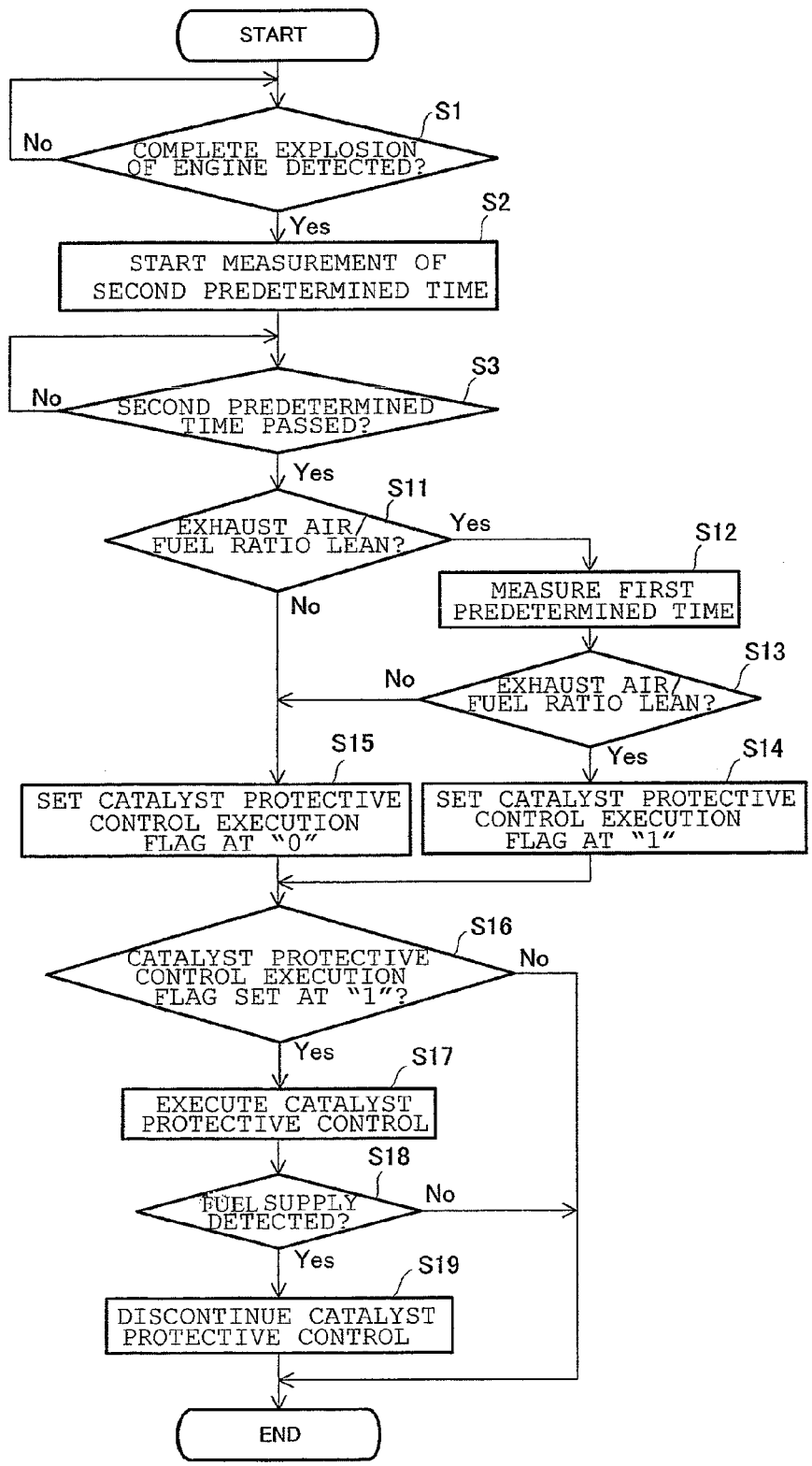
FIG. 5 is a flowchart showing an example of catalyst protective control according to Embodiment 2 of the present invention.

Next, an example of catalyst protective control according to the present embodiment will be described by reference to a flowchart shown in FIG. 5.

When the engine 12 is started by operating an ignition key or the like, for example, it is determined in Step S1 whether or not the complete explosion of the engine 12 has occurred. That is, it is determined whether or not the complete explosion of the engine 12 has been detected by the complete explosion detection unit 35. If it is determined that the engine 12 has completely exploded (Step S1: Yes), the program proceeds to Step S2, starting measurement of the second predetermined time by a timer or the like. In Step S3, it is determined whether or not the second predetermined time has passed. If the second predetermined time has passed (Step S3: Yes), the program proceeds to Step S11 to execute catalyst protective control with a predetermined timing. The processings in Step S11 and subsequent steps are the same as those in Embodiment 1, and so their explanations are omitted.

According to the control device 30 for a hybrid vehicle concerned with the present embodiment, as described above, continuation time determination by the determination unit 32 is carried out after the lapse of the second predetermined time from the detection of complete explosion of the engine 12. By so doing, the state where the exhaust air-fuel ratio is lean as a result of a decrease in the remaining fuel amount can be accurately determined. Even at the start of the engine 12, catalyst protective control can be effected with an appropriate timing based on this determination.

In the present embodiment, the second predetermined time is always set at a constant time. However, it is preferred to render the second predetermined time longer as the time until detection of the complete explosion of the engine 12 lengthens. By this measure, the state where the exhaust air-fuel ratio is lean in accordance with a decrease in the remaining fuel amount can be determined more accurately.

The present invention has been described above in regard to some embodiments thereof, but it is to be understood that the present invention is in no way limited to these embodiments. The present invention can be changed or modified, as appropriate, without departing from its spirit and scope.

EXPLANATIONS OF LETTERS OR NUMERALS

10 Vehicle (hybrid vehicle)
11 Front motor
12 Engine
13 Power transmission mechanism
14 Front wheel
16 High voltage battery
17 Fuel tank
18 Output system
19 Generator
21 Clutch
22 Fuel pipe
23 Oil filler port
24 Lid
25 Exhaust pipe
26 Exhaust purification catalyst
27 Linear air-fuel ratio sensor
30 Control device
31 Protective control unit
32 Determination unit
33 protective control execution unit
34 Oil supply detection unit
35 Complete explosion detection unit

The invention claimed is:

1. A controller for a hybrid vehicle equipped with an engine and a traction motor and having an exhaust purification catalyst in an exhaust passage, comprising:
    an exhaust air-fuel ratio detection unit, provided in the exhaust passage, for detecting an exhaust air-fuel ratio of the engine during an operation of the engine; and
    a protective controller determining that the remaining amount of fuel in the fuel tank is low when the detected exhaust air-fuel ratio continues to be lean for a first predetermined period of time, and exercising a catalyst protective control which inhibits the operation of the engine and drives the hybrid vehicle only by the traction motor.

2. The controller for a hybrid vehicle according to claim 1, further comprising:
    a complete explosion detection unit for detecting that complete explosion of the engine has occurred when the engine is started,
    wherein the protective controller determines that a fuel line between the fuel tank and the engine is filled with fuel and exercises the catalyst protective control after a lapse of a second predetermined period of time from detection of the complete explosion of the engine by the complete explosion detection unit.

3. The controller for a hybrid vehicle according to claim 2, wherein
    the protective controller extends the second predetermined period of time as a time from start of the engine until the detection of the complete explosion of the engine by the complete explosion detection unit becomes longer.

4. The controller for a hybrid vehicle according to claim 1, further comprising:
    a fuel supply detector detecting that fuel supply to a fuel tank from a fuel filler part of the hybrid vehicle has been performed,
    wherein the protective controller discontinues execution of the catalyst protective control when completion of the fuel supply is detected by the fuel supply detector.

5. A controller for a hybrid vehicle, the vehicle having at least one of travel modes including a series mode in which an engine is used as an electric power supply source for a traction motor, and a parallel mode in which both of the traction motor and the engine are used as a drive source for the vehicle, the vehicle further having an electric vehicle (EV) mode in which a battery is used as an electric power supply source for the traction motor,
    the controller comprising:
    an exhaust air-fuel ratio detection unit, provided in an exhaust passage from the engine, for detecting an exhaust air-fuel ratio of the engine during an operation of the engine; and
    a protective controller determining that the remaining amount of fuel in the fuel tank is low when the detected exhaust air-fuel ratio continues to be lean for a first predetermined period of time, and exercising a catalyst protective control which switches the travel mode to the EV mode and inhibiting the operation of the engine, such that the hybrid vehicle is driven only by the traction motor.

6. The controller for a hybrid vehicle according to claim 5, further comprising:
a complete explosion detection unit for detecting that complete explosion of the engine has occurred when the engine is started,
wherein the protective controller determines that a fuel line between the fuel tank and the engine is filled with fuel and exercises the catalyst protective control after a lapse of a second predetermined period of time from detection of the complete explosion of the engine by the complete explosion detection unit.

7. The controller for a hybrid vehicle according to claim 6, wherein
the protective controller extends the second predetermined period of time as a time from start of the engine until the detection of the complete explosion of the engine by the complete explosion detection unit becomes longer.

8. The controller for a hybrid vehicle according to claim 5, further comprising:
a fuel supply detector detecting that fuel supply to a fuel tank from a fuel filler part of the hybrid vehicle has been performed,
wherein the protective controller discontinues execution of the catalyst protective control when completion of the fuel supply is detected by the fuel supply detector.

* * * * *